US012298076B2

(12) United States Patent
Oda et al.

(10) Patent No.: US 12,298,076 B2
(45) Date of Patent: May 13, 2025

(54) DRYING DEVICE

(71) Applicant: KABUSHIKI KAISHA TOSHIBA, Tokyo (JP)

(72) Inventors: Tatsuhiro Oda, Yokohama (JP); Yuki Furutani, Hiratsuka (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 695 days.

(21) Appl. No.: 17/655,214

(22) Filed: Mar. 17, 2022

(65) Prior Publication Data

US 2023/0093759 A1 Mar. 23, 2023

(30) Foreign Application Priority Data

Sep. 21, 2021 (JP) ................................ 2021-153339

(51) Int. Cl.
*F26B 21/10* (2006.01)
*F26B 21/12* (2006.01)
*F26B 25/00* (2006.01)

(52) U.S. Cl.
CPC .............. *F26B 21/10* (2013.01); *F26B 21/12* (2013.01); *F26B 25/003* (2013.01)

(58) Field of Classification Search
CPC ......... F26B 21/10; F26B 21/12; F26B 25/003
USPC .......................................................... 34/282
See application file for complete search history.

(56) References Cited

U.S. PATENT DOCUMENTS 4,498,864 A * 2/1985 Roth ....................... F26B 23/02 432/55
4,693,911 A * 9/1987 Moreau .................. B05C 19/04 427/205
5,592,754 A * 1/1997 Krieder ................ F04B 49/022 34/80

(Continued)

FOREIGN PATENT DOCUMENTS

JP 58-117988 A 7/1983
JP 60-105883 A 6/1985

(Continued)

OTHER PUBLICATIONS

Japanese Office Action issued Dec. 20, 2024 in Japanese Patent Application No. 2021-153339 (with unedited computer-generated English Translation), 6 pages.

*Primary Examiner* — Stephen M Gravini
(74) *Attorney, Agent, or Firm* — Oblon, McClelland, Maier & Neustadt, L.L.P.

(57) ABSTRACT

A drying device according to an embodiment dries a surface of an article by blowing hot air, and includes a drying chamber including a hot air supply port that blows the hot air, an infrared camera acquiring temperature distribution information that is information related to a temperature distribution inside the drying chamber, and a controller controlling a drying condition inside the drying chamber. The controller acquires corrected temperature distribution information by performing lock-in analysis of the temperature distribution information to remove noise from the temperature distribution information, and controls the drying condition based on the corrected temperature distribution information and based on a temperature distribution model that is a model related to the temperature distribution inside the drying chamber and is pre-generated using machine learning.

4 Claims, 9 Drawing Sheets

(56) References Cited

U.S. PATENT DOCUMENTS

| | | | | | |
|---|---|---|---|---|---|
| 5,802,736 | A * | 9/1998 | Klockenkemper | B32B 38/004 34/631 |
| 6,807,750 | B1 * | 10/2004 | Lewis | F26B 23/02 34/550 |
| 9,534,840 | B2 * | 1/2017 | Pahwa | F26B 5/16 |
| 9,841,234 | B2 * | 12/2017 | Stahl | F26B 15/00 |
| 9,951,991 | B2 * | 4/2018 | Biel | D06F 60/00 |
| 10,470,484 | B2 * | 11/2019 | Breslin | A23L 7/197 |
| 10,799,923 | B2 * | 10/2020 | Richter | F23G 7/14 |
| 10,809,003 | B2 * | 10/2020 | De Beer | F26B 5/06 |
| 11,085,695 | B2 * | 8/2021 | von Bargen | B05B 16/95 |
| 2002/0055925 | A1 | 5/2002 | Kondo et al. | |
| 2014/0345153 | A1 | 11/2014 | Pahwa et al. | |
| 2023/0093759 | A1 * | 3/2023 | Oda | F26B 21/12 34/282 |

FOREIGN PATENT DOCUMENTS

| | | | | | |
|---|---|---|---|---|---|
| JP | 05-106966 | A | | 4/1993 | |
| JP | 2002-149221 | A | | 5/2002 | |
| JP | 2003-005341 | A | | 1/2003 | |
| JP | 2008-157495 | A | | 7/2008 | |
| JP | 2012-112775 | A | | 6/2012 | |
| JP | 2015-500975 | A | | 1/2015 | |
| JP | 2016-191608 | A | | 11/2016 | |
| JP | 2016-223873 | A | | 12/2016 | |
| JP | WO2017/188065 | A1 | | 11/2017 | |
| JP | 2018-504099 | A | | 2/2018 | |
| JP | 2020-94726 | A | | 6/2020 | |
| JP | 2021-47001 | A | | 3/2021 | |
| JP | 2023045111 | A | * | 4/2023 | F26B 21/10 |
| WO | WO 2019/172386 | A1 | | 9/2019 | |

* cited by examiner

DRYING DEVICE

CROSS-REFERENCE TO RELATED APPLICATIONS

This application is based upon and claims the benefit of priority from Japanese Patent Application No. 2021-153339, filed on Sep. 21, 2021; the entire contents of which are incorporated herein by reference.

FIELD

Embodiments described herein relate generally to a drying device.

BACKGROUND

There is a drying device that dries a surface of an article by blowing hot air. It is desirable to increase the drying efficiency of such a drying device.

DETAILED DESCRIPTION

Figure 1:
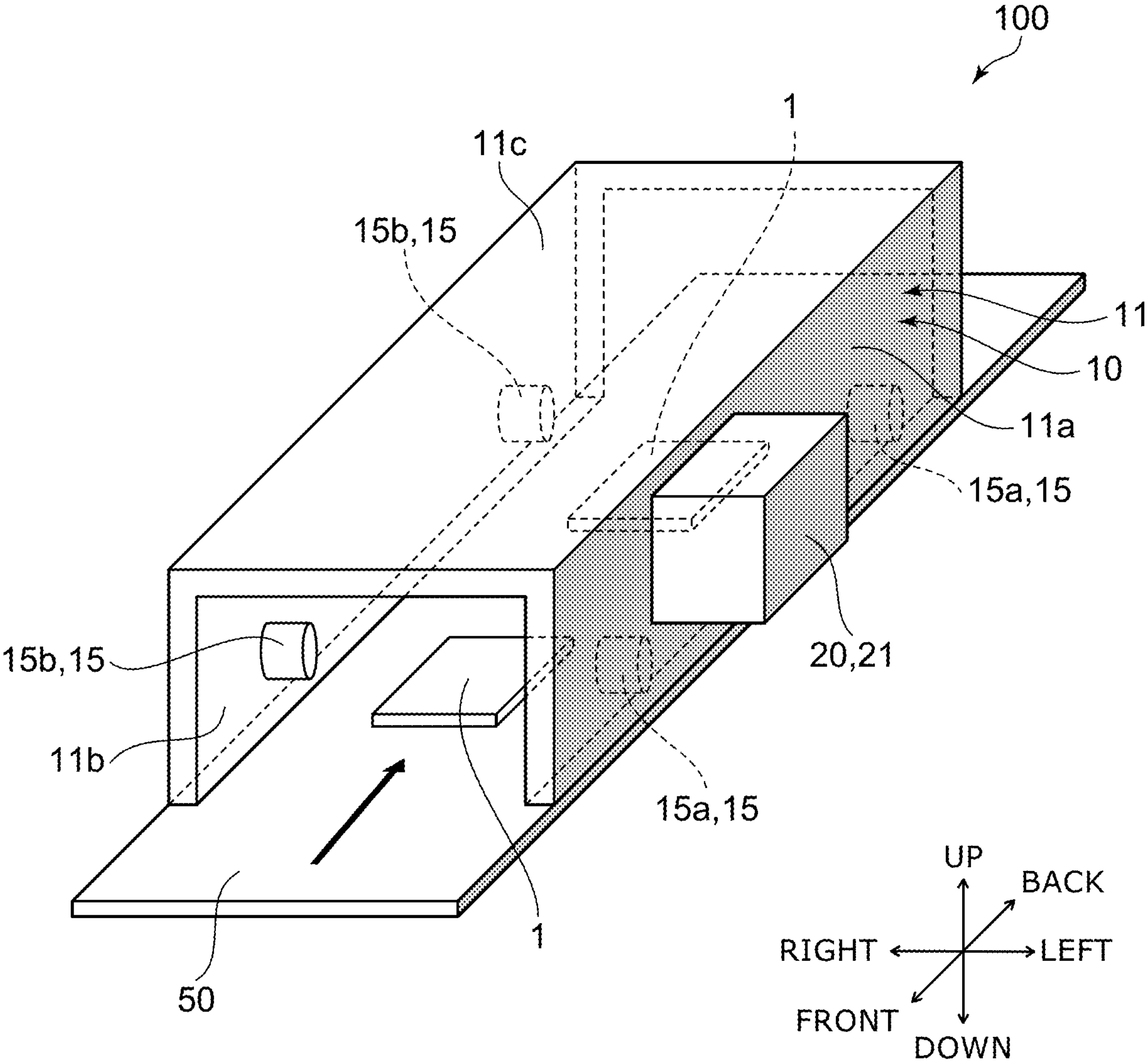
FIG. 1 is a perspective view schematically illustrating a drying device according to a first embodiment.

A drying device according to an embodiment dries a surface of an article by blowing hot air, and includes a drying chamber including a hot air supply port that blows the hot air, an infrared camera acquiring temperature distribution information that is information related to a temperature distribution inside the drying chamber, and a controller controlling a drying condition inside the drying chamber. The controller acquires corrected temperature distribution information by performing lock-in analysis of the temperature distribution information to remove noise from the temperature distribution information, and controls the drying condition based on the corrected temperature distribution information and based on a temperature distribution model that is a model related to the temperature distribution inside the drying chamber and is pre-generated using machine learning.

Exemplary embodiments will now be described with reference to the drawings.

The drawings are schematic or conceptual; and the relationships between the thickness and width of portions, the proportional coefficients of sizes among portions, etc., are not necessarily the same as the actual values thereof. Furthermore, the dimensions and proportional coefficients may be illustrated differently among drawings, even for identical portions.

In the specification of the application and the drawings, components similar to those described in regard to a drawing thereinabove are marked with like reference numerals; and a detailed description is omitted as appropriate.

First Embodiment

FIG. 1 is a perspective view schematically illustrating a drying device according to a first embodiment.

Figure 2:
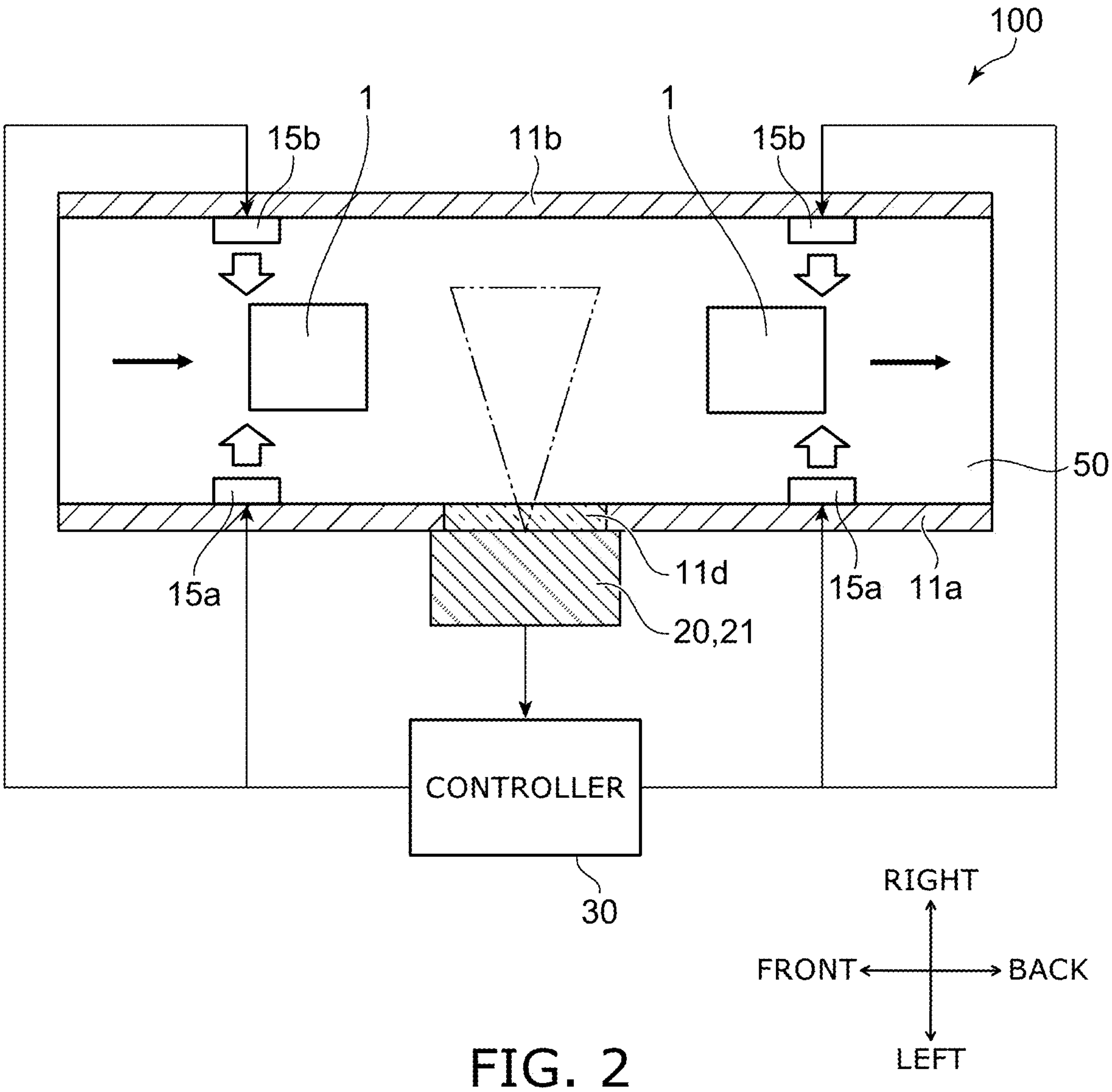
FIG. 2 is an explanatory drawing schematically illustrating the drying device according to the first embodiment.

FIG. 2 is an explanatory drawing schematically illustrating the drying device according to the first embodiment.

A cross-sectional view and a block diagram when viewed from above the drying device are illustrated together in FIG. 2.

As illustrated in FIGS. 1 and 2, the drying device 100 according to the first embodiment includes a drying chamber 10, an information acquisition part 20, and a controller 30. In the example, the drying device 100 is a conveyor-type drying device that includes a feeder 50. In the conveyor-type drying device, an article 1 that is the object of the drying is dried by placing the article 1 on the feeder 50 and by feeding the article 1 through the drying chamber 10 that blows hot air. The conveyor-type drying device can continuously perform drying processing of the multiple articles 1 fed by the feeder 50. For example, the interior of the drying chamber 10 of the conveyor-type drying device is not sealed. The feeder 50 is, for example, a belt conveyor. Hereinbelow, the feed direction of the feeder 50 is taken to be the longitudinal direction. The feeder 50 feeds the article 1 from the front toward the back. In FIGS. 1 and 2, the orientation of the feeding of the feeder 50 is shown by black arrows.

The drying device 100 may be a chamber-type drying device that does not include the feeder 50. In a chamber-type drying device, the article 1 that is the object of the drying is dried by placing the article 1 inside the drying chamber 10 and by blowing hot air. The chamber-type drying device can simultaneously perform drying processing of the multiple articles 1 by placing the multiple articles 1 inside the drying chamber 10. For example, the interior of the drying chamber 10 of the chamber-type drying device is sealed. For example, the drying of the chamber-type drying device can be promoted by setting the atmosphere inside the drying chamber 10 to be less than atmospheric pressure.

The drying chamber 10 is located above the feeder 50. The drying chamber 10 includes a main part 11 and a hot air supply port 15 provided in the main part 11. The main part 11 includes a sidewall portion 11*a* and a sidewall portion 11*b* that face each other in the lateral direction, and a ceiling portion 11*c* that faces the feeder 50 in the vertical direction. The ceiling portion 11*c* connects the upper end of the sidewall portion 11*a* and the upper end of the sidewall portion 11*b* and covers a portion of the feeder 50 from above. For example, the main part 11 is open in the longitudinal direction.

The hot air supply port 15 is located inside the drying chamber 10 and blows hot air into the drying chamber 10. For example, the hot air supply port 15 blows the hot air onto the article 1 passing through the drying chamber 10. The surface of the article 1 can be dried thereby. The hot air supply port 15 is electrically connected with the controller 30. For example, the hot air supply port 15 supplies the hot air according to a command from the controller 30.

For example, multiple hot air supply ports 15 are included. In the example, the hot air supply ports 15 include two hot air supply ports 15*a* provided in the sidewall portion 11*a* and two hot air supply ports 15*b* provided in the sidewall portion 11*b*. The hot air supply port 15 may be provided in the ceiling portion 11*c*. It is sufficient for the number of the hot air supply ports 15 to be not less than 1. It is favorable for the number of the hot air supply ports 15 to be not less than 2.

The hot air supply port 15*a* and the hot air supply port 15*b* are positioned to face each other in the lateral direction. The orientation of the air blow of the hot air supply port 15*a* is different from the orientation of the air blow of the hot air supply port 15*b*. For example, the orientation of the air blow of the hot air supply port 15*a* is opposite to the orientation of the air blow of the hot air supply port 15*b*. For example, the hot air supply port 15*a* blows air rightward. For example, the hot air supply port 15*b* blows air leftward. Thereby, the hot air can be blown toward the article 1 from multiple directions; uneven drying can be suppressed; and the drying efficiency can be increased. In FIG. 2, the orientations of the air blow of the hot air supply ports 15 are shown by white arrows with black outlines.

A window 11*d* is provided in the sidewall portion 11*a*. For example, the window 11*d* is formed of a material that is transmissive to light. For example, the window 11*d* is formed of a material that does not absorb infrared light. The window 11*d* includes, for example, sapphire. The information acquisition part 20 is located at the outer side of the window 11*d*.

The information acquisition part 20 acquires information of the state inside the drying chamber 10. For example, the information acquisition part 20 acquires temperature distribution information, flow velocity distribution information, etc. The temperature distribution information is information related to the temperature distribution inside the drying chamber 10. The flow velocity distribution information is information related to the flow velocity distribution of the airflow inside the drying chamber 10.

In the example, the information acquisition part 20 is an infrared camera 21. The infrared camera 21 acquires the temperature distribution information. The infrared camera 21 may continuously acquire the temperature distribution information or may intermittently acquire the temperature distribution information every prescribed period of time. The infrared camera 21 is electrically connected with the controller 30. The infrared camera 21 outputs the acquired temperature distribution information to the controller 30.

The controller 30 controls a drying condition inside the drying chamber 10. For example, the controller 30 controls the drying condition by controlling at least one of the temperature of the hot air blown from the hot air supply port 15, the orientation of the hot air, the airflow rate of the hot air, or the timing of the start and stop of the hot air supply. When multiple hot air supply ports 15 are included, for example, the controller 30 may control the drying condition by switching the hot air supply port 15 that blows the hot air.

A fan for controlling the velocity and/or the orientation of the airflow inside the drying chamber 10 may be located inside the drying chamber 10. In such a case, for example, the controller 30 may control the drying condition by controlling the rotation direction and/or the rotational speed of the fan.

For example, the controller 30 may control the drying condition by controlling the atmosphere inside the drying chamber 10.

A temperature distribution model is stored in the controller 30. The temperature distribution model is a model related to the temperature distribution inside the drying chamber 10. The temperature distribution model is generated using machine learning. For example, the temperature distribution model is generated using a support vector machine, a convolutional neural network, etc. For example, the teacher data of the temperature distribution model includes a temperature distribution before starting the drying of the article 1, a temperature distribution while drying the article 1, and a temperature distribution of the state in which the drying of the article 1 is completed. That is, for example, the temperature distribution model models the temporal change of the temperature distribution inside the drying chamber 10 from before the start of the drying of the article 1 until the drying of the article 1 is completed.

The controller 30 acquires corrected temperature distribution information by performing lock-in analysis of the temperature distribution information input from the infrared camera 21 to remove noise from the temperature distribution information. For example, the lock-in analysis removes the noise included in the temperature distribution information due to disturbances, etc., by using multiple sets of temperature distribution information (i.e., time-series data of the temperature distribution information) acquired every prescribed period of time. The corrected temperature distribution information that is acquired thereby can be more accurate information related to the temperature distribution.

For example, the controller 30 controls the drying condition based on the corrected temperature distribution information and the temperature distribution model. For example, the controller 30 performs feedback control of the drying condition based on the current information of the temperature distribution inside the drying chamber 10 and the temperature distribution model that is pre-generated using machine learning. For example, the controller 30 can estimate the dryness of the article 1 based on the corrected temperature distribution information and the temperature distribution model. For example, the controller 30 may control the drying condition based on the estimation result of the dryness of the article 1.

The control of the drying condition based on the corrected temperature distribution information and the temperature distribution model will now be described in more detail.

Figure 3:
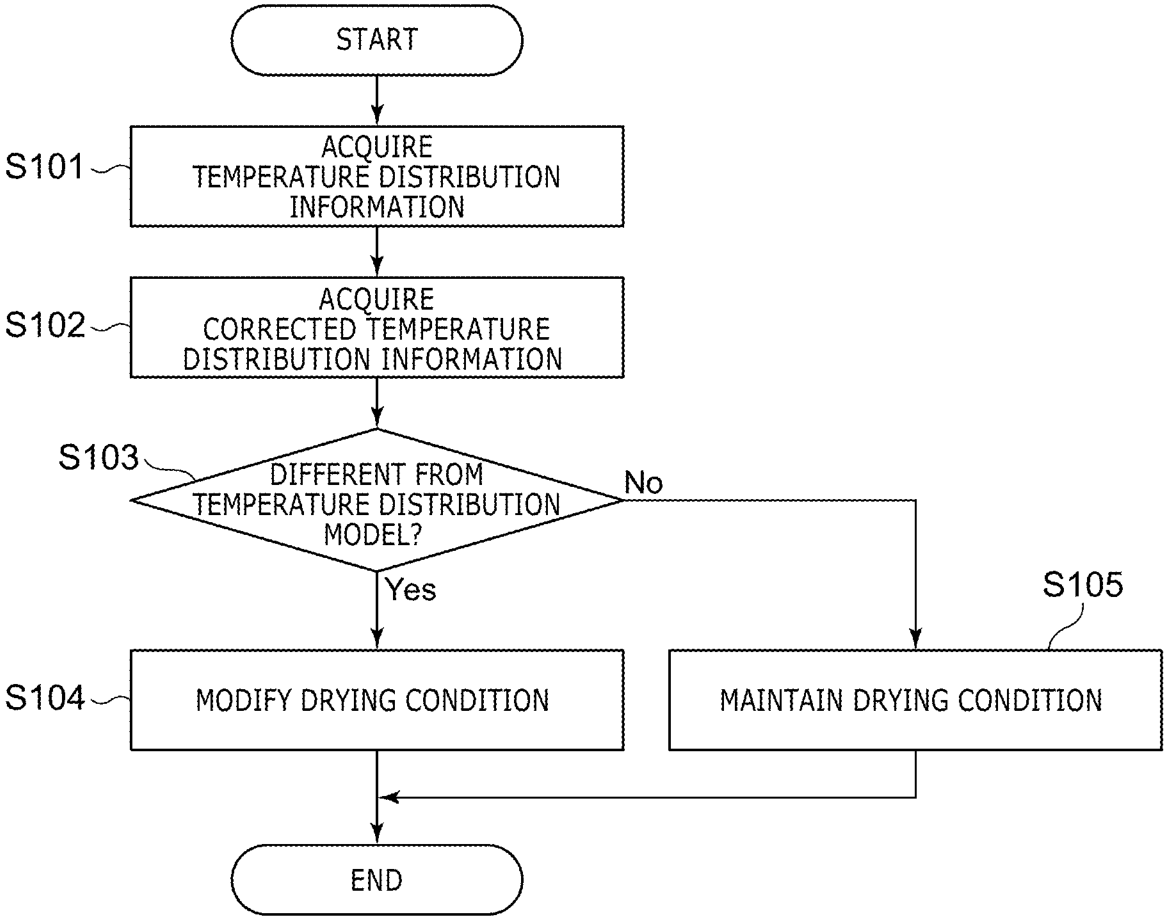
FIG. 3 is a flowchart illustrating an example of an operation of the drying device according to the first embodiment.

FIG. 3 is a flowchart illustrating an example of an operation of the drying device according to the first embodiment.

As illustrated in FIG. 3, first, the controller 30 acquires temperature distribution information via the infrared camera 21 (step S101). Then, the controller 30 acquires corrected temperature distribution information by performing lock-in analysis of the temperature distribution information (step S102).

Then, the controller 30 determines whether or not the corrected temperature distribution information is different from the temperature distribution model (step S103). For example, the controller 30 determines that the corrected temperature distribution information is different from the temperature distribution model when the temperature at a prescribed position of the corrected temperature distribution information is not about equal to the temperature at the same position in the temperature distribution model. The prescribed position is, for example, the surface of the article 1.

When the corrected temperature distribution information is determined to be different from the temperature distribution model (step S103: Yes), the controller 30 modifies the drying condition (step S104). For example, the controller 30 modifies the drying condition to reduce the difference between the corrected temperature distribution information and the temperature distribution model.

For example, when the temperature at the prescribed position in the corrected temperature distribution information is less than the temperature at the same position in the temperature distribution model, the controller 30 modifies the drying condition to promote the drying inside the drying chamber 10. For example, the controller 30 promotes the drying inside the drying chamber 10 by increasing the temperature of the hot air blown from the hot air supply port 15, causing the orientation of the hot air to approach the article 1, increasing the airflow rate of the hot air, and/or continuing the supply of the hot air.

For example, when the temperature at the prescribed position in the corrected temperature distribution information is greater than the temperature at the same position in the temperature distribution model, the controller 30 modifies the drying condition to suppress the drying inside the drying chamber 10. For example, the controller 30 suppresses the drying inside the drying chamber 10 by lowering the temperature of the hot air blown from the hot air supply port 15, setting the orientation of the hot air to be distant to the article 1, reducing the airflow rate of the hot air, and/or stopping the supply of the hot air.

When the corrected temperature distribution information is determined not to be different from the temperature distribution model (step S103: No), the controller 30 maintains the drying condition (step S105).

Thus, by controlling the drying condition based on the corrected temperature distribution information and the temperature distribution model, uneven drying can be suppressed, and the drying efficiency can be increased. Also, because the timing to complete the drying can be estimated, an excessively long time for drying can be suppressed, and the drying efficiency can be increased.

Figure 4:
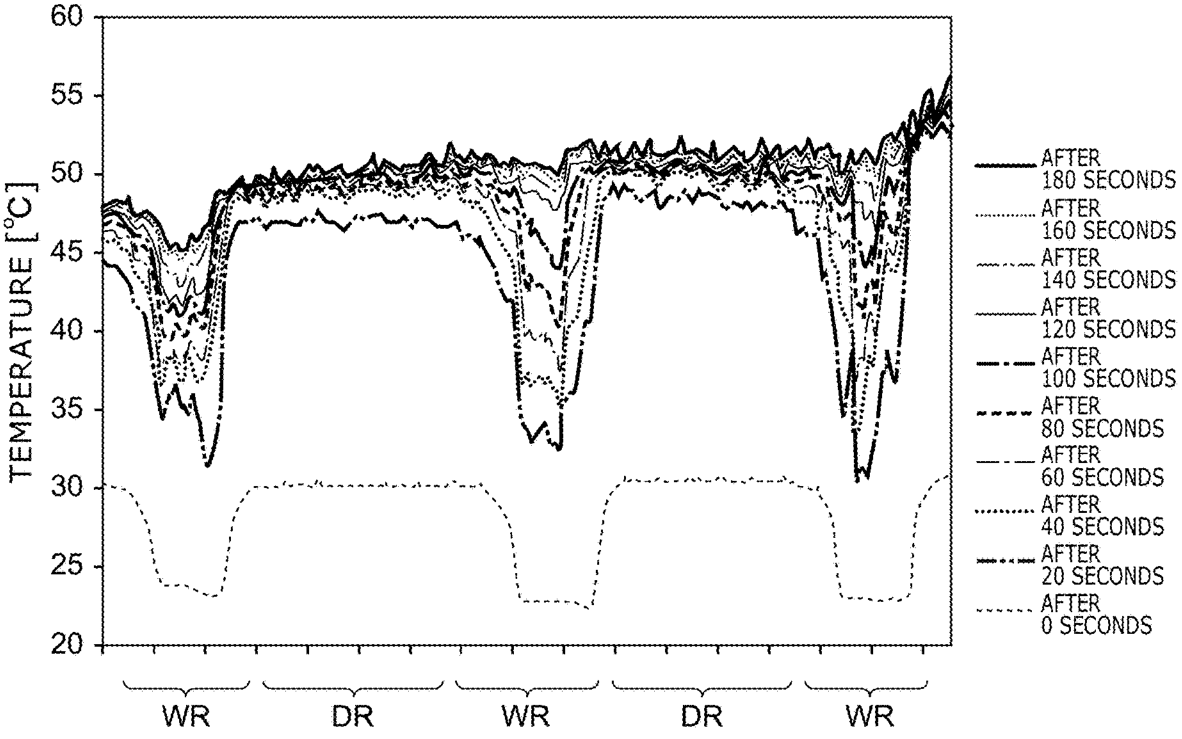
FIG. 4 is a graph showing an example of the temporal change of the corrected temperature distribution information.

FIG. 4 is a graph showing an example of the temporal change of the corrected temperature distribution information.

In FIG. 4, the sets of corrected temperature distribution information that are illustrated as time-series data are acquired by wetting regions WR at three locations of the surface of an article, placing the article inside the drying chamber of a chamber-type drying device, drying the article, acquiring sets of temperature distribution information by using an infrared camera to measure the surface temperature of the article every 20 seconds from the drying start, and by performing lock-in analysis of the sets of temperature distribution information.

As illustrated in FIG. 4, the surface temperature of the article increases as time elapses from the drying start. The surface temperature at the wetted regions WR is reduced by the vaporization heat as the liquid evaporates. Therefore, the temperatures of the wetted regions WR are less than the temperatures of regions DR that are not wetted.

The temperature change per unit time decreases as time elapses from the drying start. Therefore, for example, it can be estimated that the surface of the article approaches the dry state when the temperature change per unit time is small.

For example, the controller 30 may acquire the temperature change information that is information related to the temporal change of the corrected temperature distribution information, estimate the timing of the completion of the drying based on the temperature change information, and determine the timing of ending the drying. More specifically, for example, the controller 30 may control the end of the drying when the temperature change per unit time is less than a prescribed value. For example, the prescribed value can be calculated from the temperature distribution model.

The control of determining the timing of ending the drying based on the temperature change information will now be described in more detail.

Figure 5:
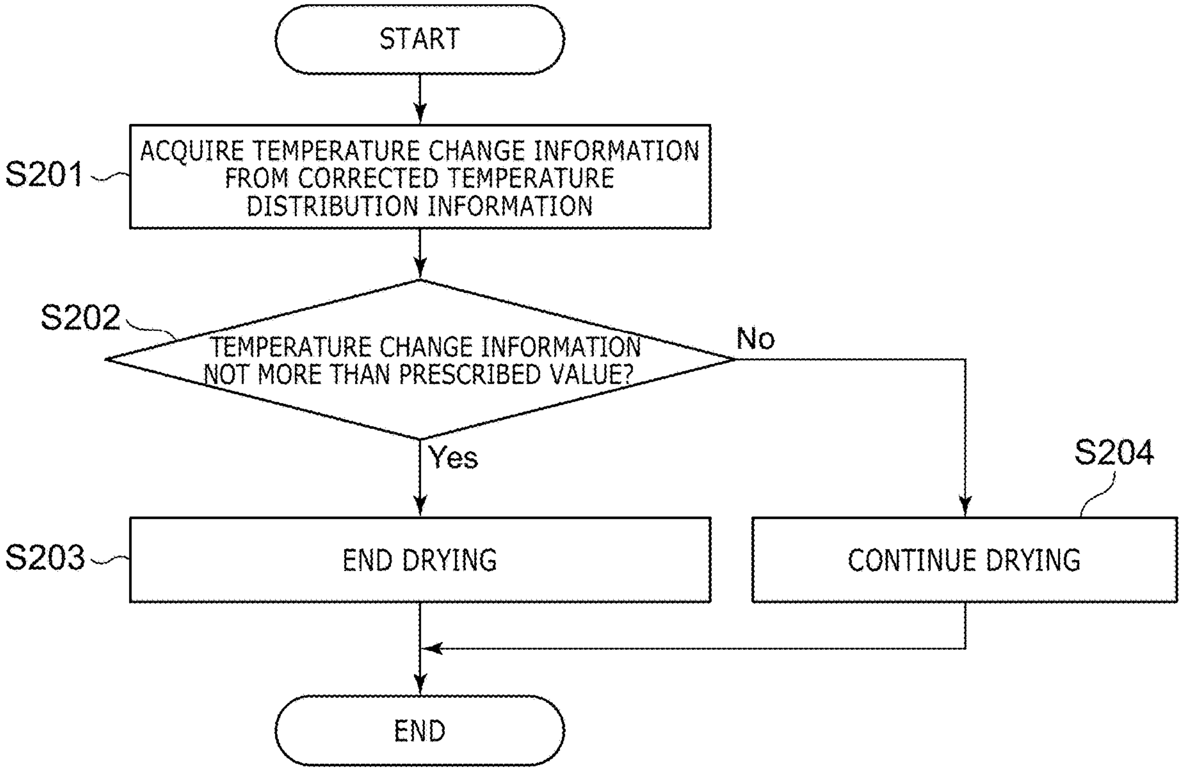
FIG. 5 is a flowchart illustrating an example of an operation of a drying device according to a modification of the first embodiment.

FIG. 5 is a flowchart illustrating an example of an operation of a drying device according to a modification of the first embodiment.

As illustrated in FIG. 5, first, the controller 30 acquires temperature change information that is information related to the temporal change of the corrected temperature distribution information from the corrected temperature distribution information (step S201). Here, the temperature change information is the temperature change per unit time. The unit time is, for example, 20 seconds.

Then, the controller 30 determines whether or not the temperature change (the temperature change information) per unit time is not more than a prescribed value (step S202). The prescribed value is, for example, 1° C.

When the temperature change (the temperature change information) per unit time is not more than the prescribed value (step S202: Yes), the controller 30 ends the drying (step S203). When the temperature change (the temperature change information) per unit time is greater than the prescribed value (step S202: No), the controller 30 continues the drying (step S204).

Thus, by determining the timing of ending the drying based on the temperature change information, an excessively long time for drying can be suppressed, and the drying efficiency can be increased.

For example, the control of determining the timing of ending the drying based on the temperature change information may be performed using a chamber-type drying device.

Second Embodiment

Figure 6:
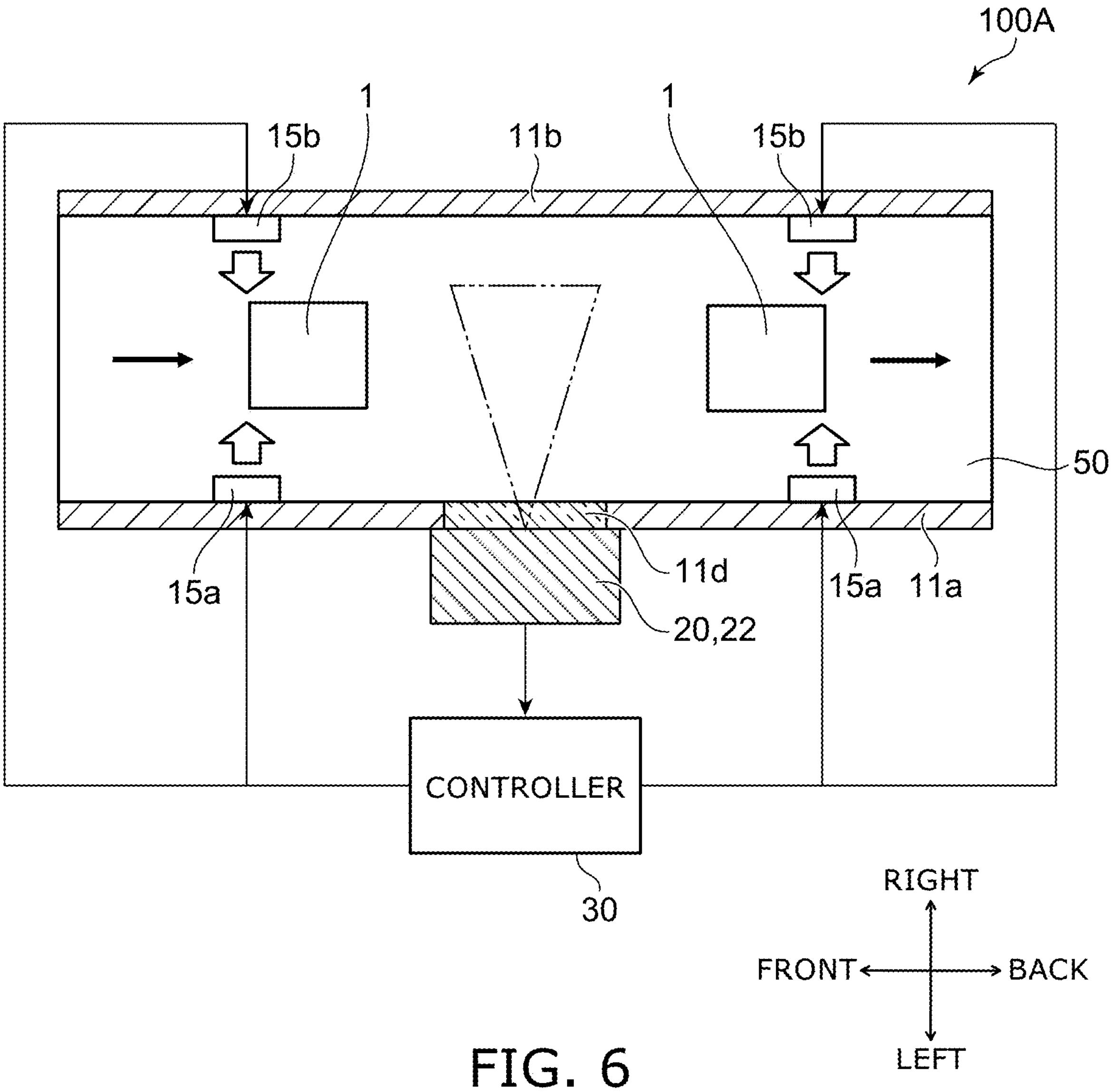
FIG. 6 is an explanatory drawing schematically illustrating a drying device according to a second embodiment.

FIG. 6 is an explanatory drawing schematically illustrating a drying device according to a second embodiment.

A cross-sectional view and a block diagram when viewed from above the drying device are illustrated together in FIG. 6.

As illustrated in FIG. 6, the drying device 100A according to the second embodiment includes a high-speed camera 22 as the information acquisition part 20. Otherwise, the drying device 100A is the same as the drying device 100 according to the first embodiment.

The high-speed camera 22 acquires flow velocity distribution information. The high-speed camera 22 acquires flow velocity distribution information by using particle image velocimetry. The high-speed camera 22 may continuously acquire the flow velocity distribution information or may intermittently acquire the flow velocity distribution information every prescribed period of time. In particle image velocimetry, the velocity and the direction of the airflow (i.e., the flow velocity distribution) can be determined without contact by mixing tracer particles into the fluid and by acquiring a particle image of the tracer particles. The high-speed camera 22 is electrically connected with the controller 30. The high-speed camera 22 outputs the acquired flow velocity distribution information to the controller 30.

A flow velocity distribution model is stored in the controller 30. The flow velocity distribution model is a model related to the flow velocity distribution of the airflow inside the drying chamber 10. The flow velocity distribution model is generated using machine learning. For example, the flow velocity distribution model is generated using a support vector machine, a convolutional neural network, etc. For example, the teacher data of the flow velocity distribution model includes a flow velocity distribution before starting the drying of the article 1, a flow velocity distribution while drying the article 1, and a flow velocity distribution in a state in which the drying of the article 1 is completed. That is, for example, the flow velocity distribution model models the temporal change of the flow velocity distribution inside the drying chamber 10 from before starting the drying of the article 1 until the drying of the article 1 is completed.

For example, the controller 30 controls a drying condition based on the flow velocity distribution information and the flow velocity distribution model. For example, the controller 30 performs feedback control of the drying condition based on the current information of the flow velocity distribution of the airflow inside the drying chamber 10 and the flow velocity distribution model that is pre-generated using machine learning. Also, for example, the controller 30 can estimate the dryness of the article 1 based on the flow velocity distribution information and the flow velocity distribution model. For example, the controller 30 may control the drying condition based on the estimation result of the dryness of the article 1.

The control of the drying condition based on the flow velocity distribution information and the flow velocity distribution model will now be described in more detail.

Figure 7:
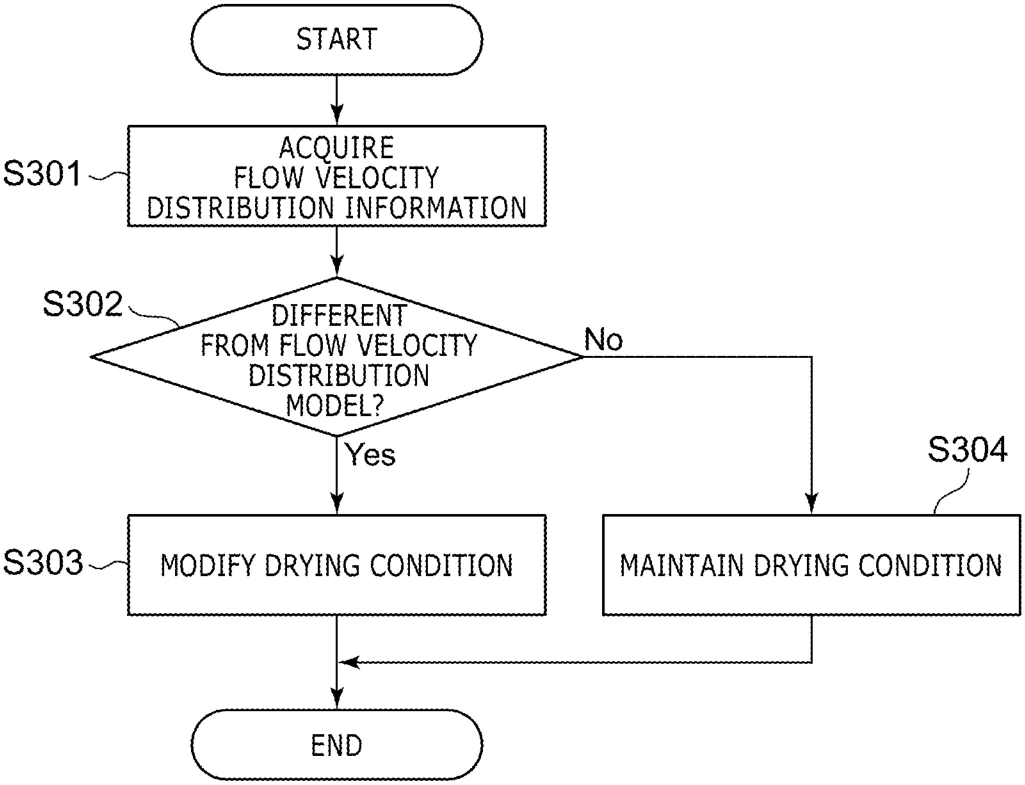
FIG. 7 is a flowchart illustrating an example of an operation of the drying device according to the second embodiment.

FIG. 7 is a flowchart illustrating an example of an operation of the drying device according to the second embodiment.

As illustrated in FIG. 7, first, the controller 30 acquires flow velocity distribution information via the high-speed camera 22 (step S301).

Then, the controller 30 determines whether or not the flow velocity distribution information is different from the flow velocity distribution model (step S302). For example, the controller 30 determines that the flow velocity distribution information is different from the flow velocity distribution model when the flow velocity at a prescribed position in the flow velocity distribution information is not about equal to the flow velocity at the same position in the flow velocity distribution model.

When the flow velocity distribution information is determined to be different from the flow velocity distribution model (step S302: Yes), the controller 30 modifies the drying condition (step S303). For example, the controller 30 modifies the drying condition to reduce the difference between the flow velocity distribution information and the flow velocity distribution model.

For example, when the flow velocity at the prescribed position in the flow velocity distribution information is less than the flow velocity at the same position in the flow velocity distribution model, the controller 30 modifies the drying condition to promote the drying inside the drying chamber 10. For example, the controller 30 promotes the drying inside the drying chamber 10 by increasing the temperature of the hot air blown from the hot air supply port 15, causing the orientation of the hot air to approach the article 1, increasing the airflow rate of the hot air, and/or continuing the supply of the hot air.

For example, when the flow velocity at the prescribed position in the flow velocity distribution information is greater than the flow velocity at the same position in the flow velocity distribution model, the controller 30 modifies the drying condition to suppress the drying inside the drying chamber 10. For example, the controller 30 suppresses the drying inside the drying chamber 10 by lowering the temperature of the hot air blown from the hot air supply port 15, causing the orientation of the hot air to be distant to the article 1, reducing the airflow rate of the hot air, and/or stopping the supply of the hot air.

When the flow velocity distribution information is determined not to be different from the flow velocity distribution model (step S302: No), the controller 30 maintains the drying condition (step S304).

Thus, by controlling the drying condition based on the flow velocity distribution information and the flow velocity distribution model, uneven drying can be suppressed, and the drying efficiency can be increased. Also, because the timing of the completion of the drying can be estimated, an excessively long time for drying can be suppressed, and the drying efficiency can be increased.

Third Embodiment

Figure 8:
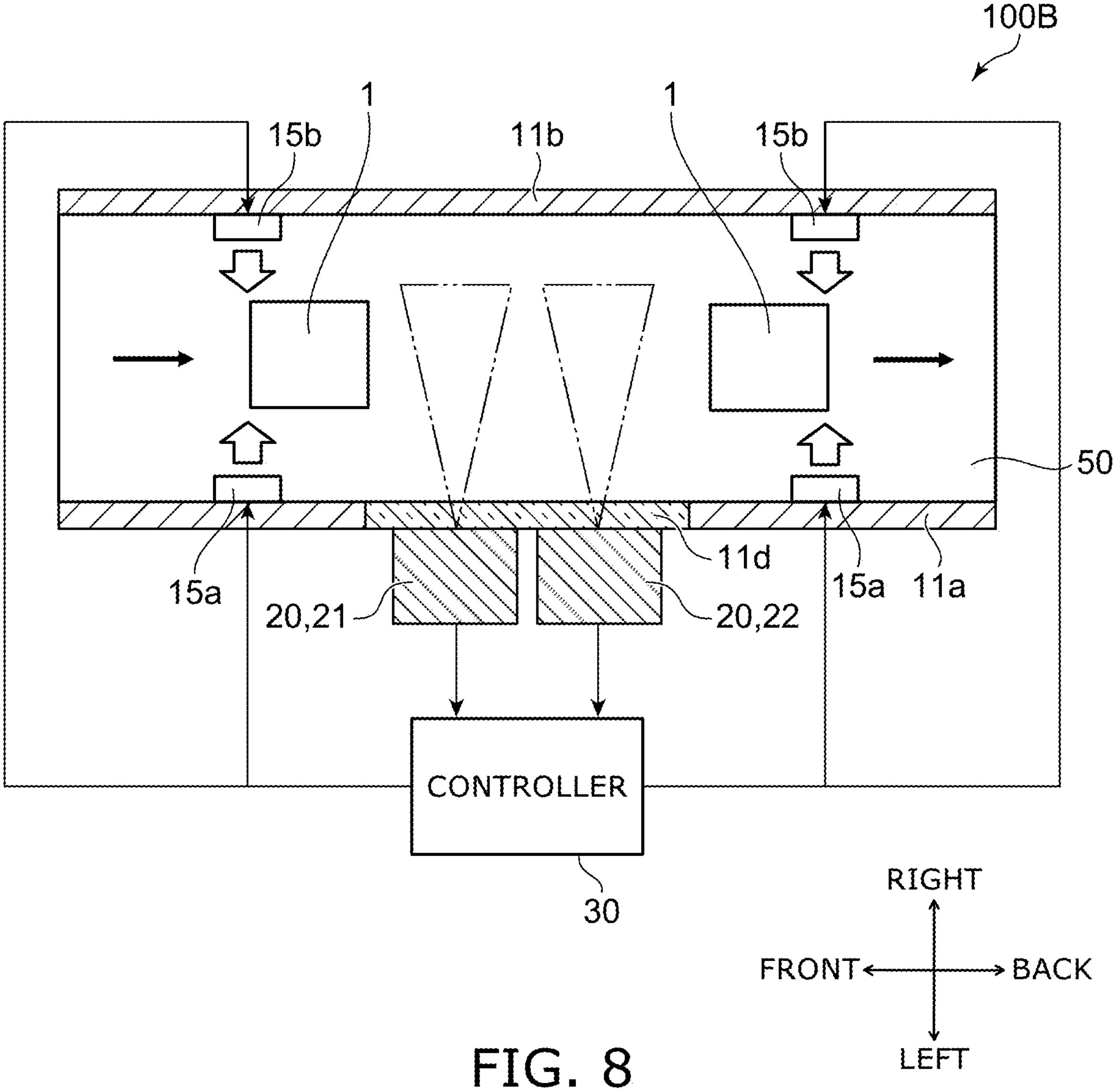
FIG. 8 is an explanatory drawing schematically illustrating a drying device according to a third embodiment.

FIG. 8 is an explanatory drawing schematically illustrating a drying device according to a third embodiment.

A cross-sectional view and a block diagram when viewed from above the drying device are illustrated together in FIG. 8.

As illustrated in FIG. 8, the drying device 100B according to the third embodiment includes both the infrared camera 21 and the high-speed camera 22 as the information acquisition part 20. Otherwise, the drying device 100B is the same as the drying device 100 according to the first embodiment and the drying device 100A according to the second embodiment.

A temperature distribution model and a flow velocity distribution model are stored in the controller 30. For example, the controller 30 controls the drying condition based on the corrected temperature distribution information, the temperature distribution model, the flow velocity distribution information, and the flow velocity distribution model. For example, the controller 30 performs feedback control of the drying condition based on the current information of the change of the temperature distribution inside the drying chamber 10, the temperature distribution model that is pre-generated using machine learning, the current information of the flow velocity distribution of the airflow inside the drying chamber 10, and the flow velocity distribution model that is pre-generated using machine learning. Also, for example, the controller 30 can estimate the dryness of the article 1 based on the corrected temperature distribution information, the temperature distribution model, the flow velocity distribution information, and the flow velocity distribution model. For example, the controller 30 may control the drying condition based on the estimation result of the dryness of the article 1.

The control of the drying condition based on the corrected temperature distribution information, the temperature distribution model, the flow velocity distribution information, and the flow velocity distribution model will now be described in more detail.

Figure 9:
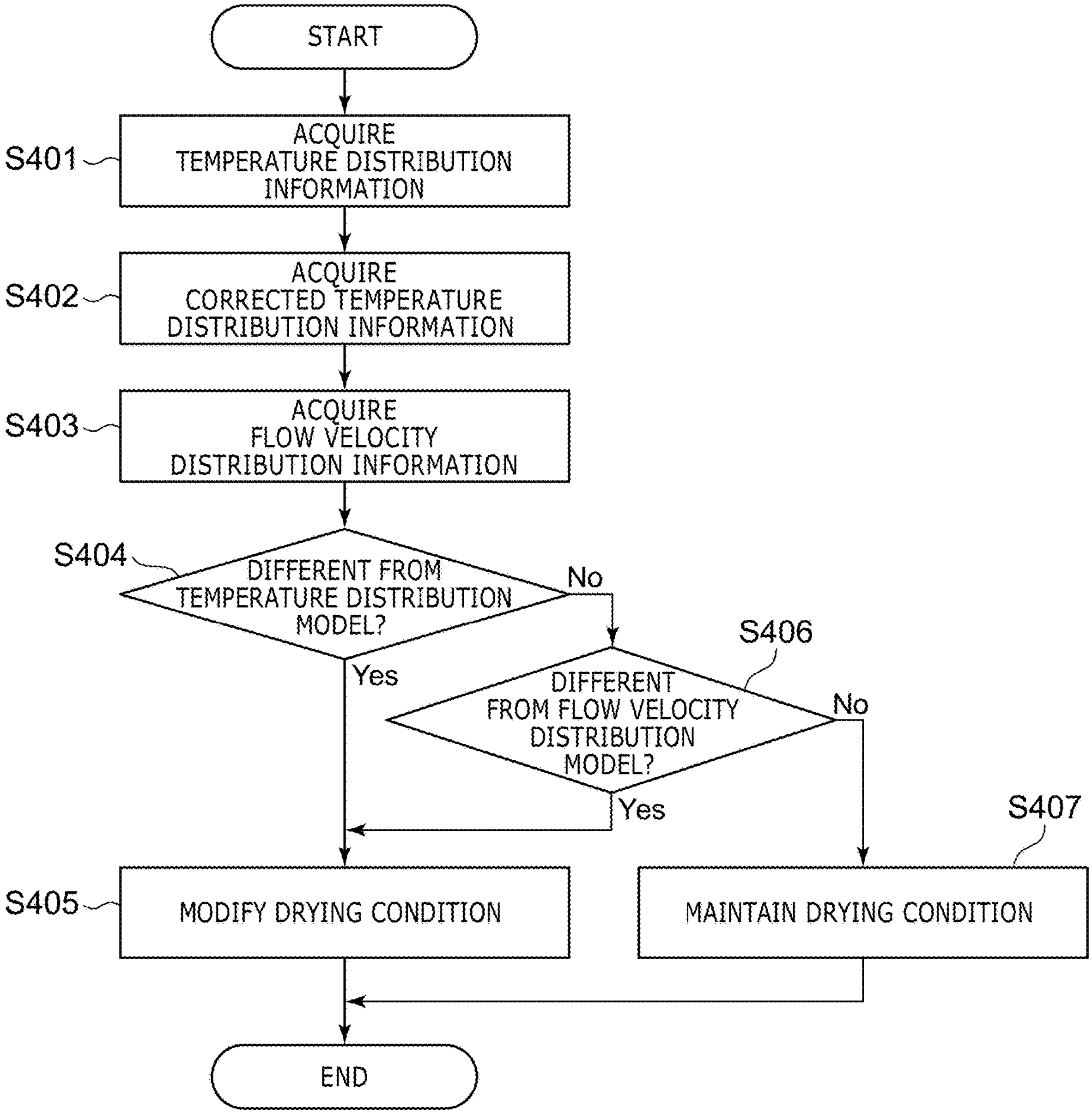
FIG. 9 is a flowchart illustrating an example of an operation of the drying device according to the third embodiment.

FIG. 9 is a flowchart illustrating an example of an operation of the drying device according to the third embodiment.

As illustrated in FIG. 9, first, the controller 30 acquires temperature distribution information via the infrared camera 21 (step S401) and acquires corrected temperature distribution information by performing lock-in analysis of the temperature distribution information (step S402). Steps S401 and S402 can be performed similarly to steps S101 and S102.

Then, the controller 30 acquires flow velocity distribution information via the high-speed camera 22 (step S403). Step S403 can be performed similarly to step S301. Step S403 may be performed before steps S401 and S402 or may be simultaneously performed with steps S401 and S402.

Then, the controller 30 determines whether or not the corrected temperature distribution information is different from the temperature distribution model (step S404). Step S404 can be performed similarly to step S103.

When the corrected temperature distribution information is determined to be different from the temperature distribution model (step S404: Yes), the controller 30 modifies the drying condition (step S405). Step S405 can be performed similarly to steps S104 and S303.

When the corrected temperature distribution information is determined not to be different from the temperature distribution model (step S404: No), the controller 30 determines whether or not the flow velocity distribution information is different from the flow velocity distribution model (step S406). Step S406 can be performed similarly to step S302.

When the flow velocity distribution information is determined to be different from the flow velocity distribution model (step S406: Yes), the controller 30 proceeds to step S405.

When the flow velocity distribution information is determined not to be different from the flow velocity distribution model (step S406: No), the controller 30 maintains the drying condition (step S407). Step S404 can be performed similarly to steps S105 and S304.

In the example, the drying condition is modified when the corrected temperature distribution information is different from the temperature distribution model (step S404: Yes) or when the flow velocity distribution information is different from the flow velocity distribution model (step S406: Yes); however, the drying condition may be modified when the corrected temperature distribution information is different from the temperature distribution model (step S404: Yes) and when the flow velocity distribution information is different from the flow velocity distribution model (step S406: Yes). That is, steps S404 and S406 may have an OR relationship or an AND relationship.

Thus, by controlling the drying condition based on the corrected temperature distribution information, the temperature distribution model, the flow velocity distribution information, and the flow velocity distribution model, uneven drying can be suppressed, and the drying efficiency can be further improved. Also, because the timing of the completion of the drying can be more accurately estimated, an excessively long time for drying can be suppressed, and the drying efficiency can be further improved.

According to embodiments as described above, a drying device is provided in which the drying efficiency can be increased.

For example, the drying device according to embodiments can be used to manufacture a semiconductor device. For example, the drying device according to embodiments can be used in a film formation process of drying a coating that is coated onto a substrate, a cleaning process of cleaning and drying a substrate, etc.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions. Embodiments described above can be implemented in combination with each other.

What is claimed is:

1. A drying device drying a surface of an article by blowing hot air, the drying device comprising:

a drying chamber including a hot air supply port, the hot air supply port blowing the hot air;

an infrared camera acquiring temperature distribution information, the temperature distribution information being information related to a temperature distribution inside the drying chamber; and a controller controlling a drying condition inside the drying chamber, the controller acquiring corrected temperature distribution information and controlling the drying condition based on the corrected temperature distribution information and a temperature distribution model, the corrected temperature distribution information being obtained by performing lock-in analysis of the temperature distribution information to remove noise from the temperature distribution information, the temperature distribution model being a model related to the temperature distribution inside the drying chamber, the temperature distribution model being pre-generated using machine learning.

2. The drying device according to claim 1, wherein the controller acquires temperature change information and determines a timing of ending the drying based on the temperature change information, and the temperature change information is information related to a temporal change of the corrected temperature distribution information.

3. The drying device according to claim 2, further comprising:

a high-speed camera acquiring flow velocity distribution information by using particle image velocimetry, the flow velocity distribution information being information related to a flow velocity distribution of an airflow inside the drying chamber, the controller controlling the drying condition based on the corrected temperature distribution information, the temperature distribution model, the flow velocity distribution information, and a flow velocity distribution model, the flow velocity distribution model being a model related to the flow velocity distribution of the airflow inside the drying chamber, the flow velocity distribution model being pre-generated using machine learning.

4. A drying device drying a surface of an article by blowing hot air, the drying device comprising:

a drying chamber including a hot air supply port, the hot air supply port blowing the hot air;

a high-speed camera acquiring flow velocity distribution information by using particle image velocimetry, the flow velocity distribution information being information related to a flow velocity distribution of an airflow inside the drying chamber; and a controller controlling a drying condition inside the drying chamber, the controller controlling the drying condition based on the flow velocity distribution information and a flow velocity distribution model, the flow velocity distribution model being a model related to the flow velocity distribution of the airflow inside the drying chamber, the flow velocity distribution model being pre-generated using machine learning.

* * * * *